United States Patent [19]

Harding et al.

[11] 4,237,967
[45] Dec. 9, 1980

[54] MOTOR VEHICLE AIR CONDITIONER CONTROL CIRCUIT

[75] Inventors: Robert C. Harding, Dallas; Jack E. Herweg, Fort Worth, both of Tex.

[73] Assignees: Lone Star Manufacturing Company, Inc., Fort Worth; Genelco, Inc., Dallas, both of Tex.

[21] Appl. No.: 3,352

[22] Filed: Jan. 15, 1979

[51] Int. Cl.$^3$ ............................................. B60H 3/00
[52] U.S. Cl. ...................... 165/43; 165/137; 62/323R
[58] Field of Search .......... 165/13, 14, 32, 33, 165/41, 42, 43, 137; 307/9, 10 R; 62/244, 323 X

[56] References Cited

U.S. PATENT DOCUMENTS

| Re. 28,676 | 1/1976 | Edelman et al. | 236/1 C |
|---|---|---|---|
| 3,444,700 | 5/1969 | Beyer | 165/41 X |
| 3,973,620 | 8/1976 | Stringer | 165/42 |
| 4,022,599 | 5/1977 | Wilson et al. | 62/244 |

*Primary Examiner*—Albert W. Davis
*Assistant Examiner*—Margaret A. Focarino
*Attorney, Agent, or Firm*—James E. Bradley

[57] ABSTRACT

A circuit for allowing an air conditioner to be installed in a motor vehicle using the vehicle's existing heater and vent controls. A slide potentiometer is attached to the heater control arm that normally controls the heater air temperature. The slide potentiometer has two resistance elements electrically separated from each other, but only a single wiper that moves from one to the other as the arm is moved. The air conditioner and heater have separate blowers, but both are connected to the conventional heater blower switch. A relay is connected to the heater and air conditioner blower circuits for enabling either one or the other to operate. The relay is actuated by a switching circuit that is completed only when the wiper is in contact with one of the resistance elements and not the other. Another enabling circuit is completed when the slide potentiometer wiper is in contact with the other resistance element. This latter circuit enables the air conditioner temperature regulating circuitry to function.

10 Claims, 3 Drawing Figures

MOTOR VEHICLE AIR CONDITIONER CONTROL CIRCUIT

BACKGROUND OF THE INVENTION

1. Field of the Invention

This invention relates in general to electrical controls for air conditioners and in particular to an electrical circuit that allows an air conditioner to be installed in a motor vehicle using the vehicle's existing heater and vent controls.

2. Description of the Prior Art

While many vehicles are sold with the air conditioners installed at the factory, there are also many vehicles in which the air conditioner is installed after the original purchase from the manufacturer. In installing these units, it is desired to make their installation look very similar to vehicles in which the air conditioner was installed at the factory. One problem is that the so called "after market" air conditioners have their own blowers. In the "factory" installations, the heater and the air conditioner usually use the same blower. Also, the temperature control lever in a non-factory air vehicle controls only the heater and vent air, and would have no effect on the air conditioner temperature regulating circuit. Consequently a control member for this function is needed, as well as an on/off switch for the air conditioner. These additional controls for the air conditioner detract from the overall appearance of the installation, making it readily apparent that the air conditioner is not a factory installation.

Proposals have been made to couple additional circuitry to the heater blower switch and to the existing mode switch (i.e., heat, vent, defrost), to control the air conditioner, however, improvements are desired.

SUMMARY OF THE INVENTION

It is accordingly the general object of this invention to provide an improved means for allowing existing heater and vent controls to also be used for controlling an air conditioner in a motor vehicle.

In accordance with this object, a circuit is provided that utilizes the heater temperature arm or lever. A slide potentiometer having two electrically separated resistance elements is mounted in engagement with the arm so that movement of the arm from the coolest position to the warmest position moves the potentiometer wiper from one resistance element to the other resistance element. The air conditioner blower is connected to the heater blower switch in parallel with the heater blower. A relay completes either the air conditioner blower circuit or the heater blower circuit. The relay is energized by a switch means, which in turn is actuated by placing the wiper in contact with one of the resistance elements. Moving the wiper to the other resistance element de-energizes the switch means, allowing the relay to flip back to the other blower circuit. Placing the wiper in contact with the resistance element designated for the air conditioning circuit, also completes a circuit to enable the air conditioning temperature regulating circuit to function. A second switch means is connected to the blower switch to allow the temperature regulating circuit to function only when the blower switch is on.

DESCRIPTION OF THE PREFERRED EMBODIMENT

Figure 1:
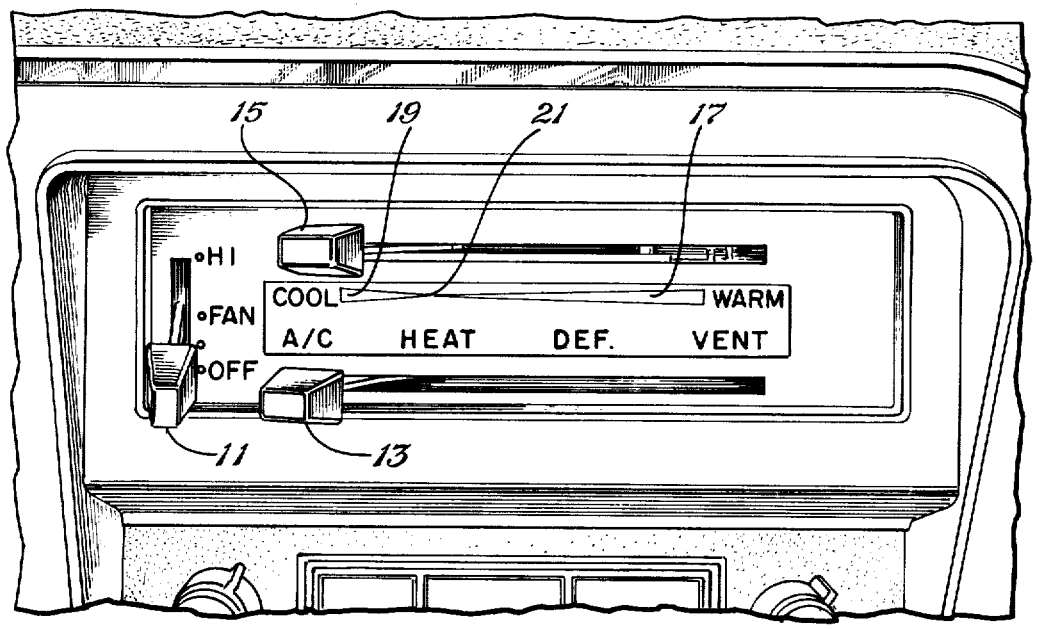
FIG. 1 is a front elevational view of the heater and vent controls of a vehicle, modified in accordance with this invention, to also control the air conditioner.

Referring to FIG. 1, the heater and vent controls of a typical vehicle are shown, as they appear after modification for an air conditioner. Most vehicles have a fan or blower switch 11, a mode switch 13, and a temperature control lever or arm 15. The conventional temperature control arm 15 moves horizontally through an infinite number of positions between the coolest on the left and the warmest on the right. A cable (not shown) is connected between the control arm 15 and a heater control means (not shown). In some vehicles, the heater control means comprises a water valve that regulates the flow of hot water to the heater radiator in response to the position of arm 15. In other vehicles, the control means comprises a door that restricts the flow of air through the heater radiator and mixes it with outside air.

The conventional mode switch 13 closes doors to direct the air discharged through the heater radiator through certain outlets below the dash for heat or onto the windshield for defrost. It also normally has a vent position for receiving outside air, and normally an off position, which is relabeled "A/C" in the drawing. In a conventional vehicle, the blower switch 11 will cause the blower to force air through the selected doors in any of the modes, the blower being uninfluenced by the position of arm 15. Consequently, although in the block diagram of FIG. 2, the vehicle blower is labeled "Heater Blower", it also discharges air when the mode switch 13 is in the vent mode. Blower switch 11, as shown in the block diagram of FIG. 2, is capable of controlling the heater blower speed, and in many vehicles has an off position.

To install an air conditioner in a vehicle using these controls, blower switch 11 and temperature arm 15 are utilized. The mode switch 13 is not altered, although the new face plate shows the previous off position to be the "A/C" or air conditioner position. The new face plate also has two indicators, warm range 17, and cool range 19. Indicator 19 indicates that the air conditioner is operable up to the junction point 21. From junction point 21, through indicator 17 to the extreme right, the air conditioner is not operable, and the heater, defroster, or vent is operable. The warm indicator 17 is considerably longer than the cool indicator 19.

Figure 2:
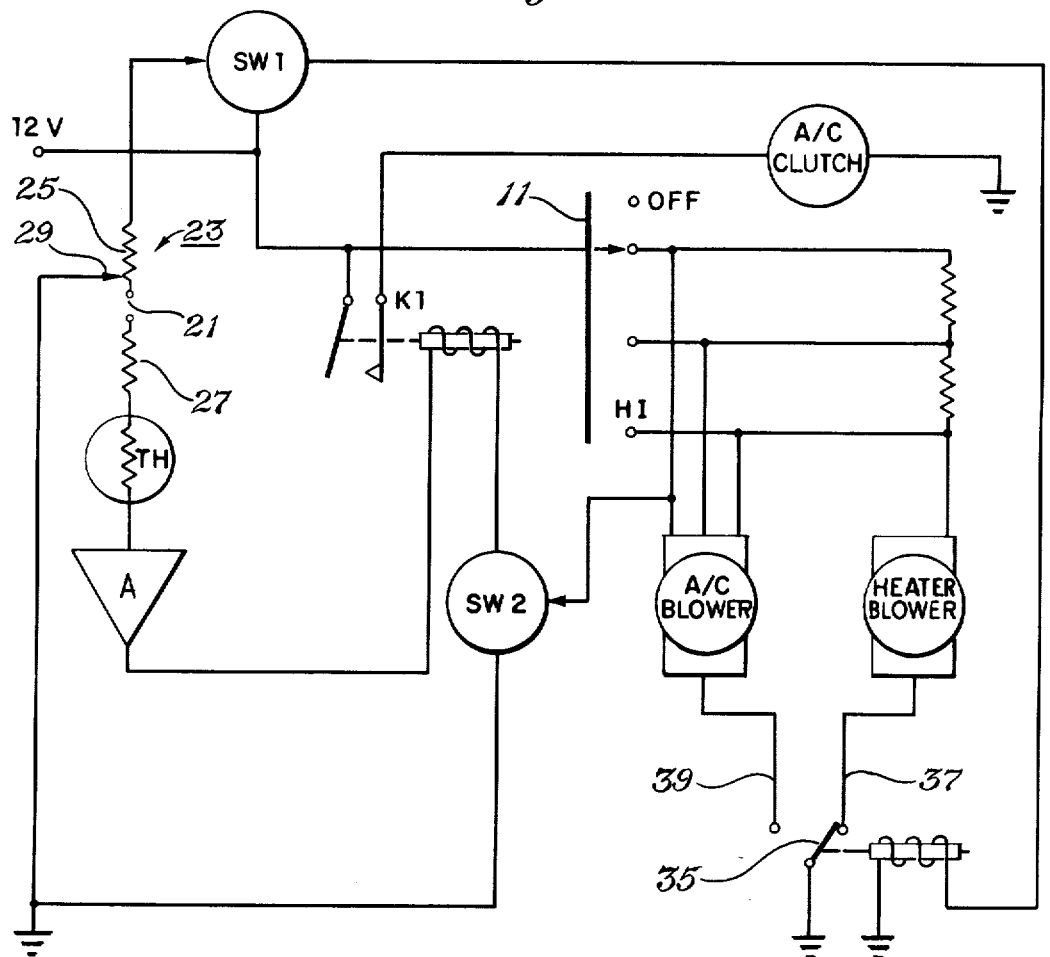
FIG. 2 is a block diagram illustrating the circuitry in accordance with this invention.

As shown in the block diagram of FIG. 2, a slide potentiometer 23 is mounted in engagement with the temperature arm 15. Slide potentiometer 23 contains two flat resistance elements 25 and 27 that are coplanar, but electrically separated from each other as shown at junction 21. Resistance element 25 is considerably longer than resistance element 27. Slide potentiometer 23 has a wiper 29 that moves in unison with temperature arm 15 and is adapted to engage resistance element 27 when in the cool range portion 19, and resistance element 25 when in the warm range 17.

The separate air conditioner blower is connected directly to the blower switch 11 in parallel with the heater blower. A relay 35 has its movable contact connected to ground. The contact of relay 35 is adapted to either contact that heater blower ground lead 37 or the air conditioner blower ground lead 39. When in contact with the air conditioner ground lead 39, it places the air conditioner blower circuit in contact with the ground, enabling it to be energized. The heater blower ground lead 37 will be open at that time. When relay 35 is de-energized, its movable contact always reverts to contact with the air conditioner ground lead 39.

Relay 35 is connected to a switch means, indicated as SW1. Switch means SW1 has a 12 volt input line and is connected to resistance element 25 of potentiometer 23. Wiper 29 is grounded and contact of wiper 29 with resistance element 25 completes the circuit for the switch means SW1 to energize relay 35 to contact heater blower ground lead 37.

Resistance element 27 of potentiometer 23 is connected to a conventional temperature sensing device or thermistor TH. Thermistor TH is connected to a temperature regulating circuit labeled A. The temperature regulating circuit A is connected to a relay K1 that supplies 12 V to the air conditioner compressor clutch when closed. The second switch means SW2 is connected to a blower 12 V supply line, and is positioned between the relay K1 and ground. Switch means SW2 must be energized by current flow through the blower switch 11 before it will allow the temperature regulating circuit to close the relay K1.

In operation, as shown in the block diagram, for heater operation, mode switch 13 is placed on "Heat", temperature arm 15 is moved to any position to the right of junction 21, and blower switch 11 is turned on. When wiper 29 is in contact with resistance element 25, which merely serves as a conductor, switch means SW1 will have its circuit completed to ground. It thus signals relay 35 to shift its contact into contact with heater ground lead 37. Since the blower switch 11 is on, the heater blower will be energized. The temperature of the air is regulated normally by moving the arm 15 to a selected position between junction 21 and the far right or warmest position. The cable or control means from arm 15 to the water valve or control door remains undisturbed by the addition of the slide potentiometer 23 to the arm 15. For the vent mode, the arm 15 is moved to a position within warm range 17 but very close to junction 21 so as to avoid adding heat to the temperature of the incoming air from the heater radiator. The heater blower can be used in the vent position, or the operator may wish to rely only on the ram air.

For air conditioner operation, the operator places the arm 15 at any point within cool range 19. This places the wiper 29 in contact with resistance element 27. Removal of wiper 29 from resistance element 25 breaks the circuit for the switch means SW1, de-energizing relay 35. The contact of relay 35 thus reverts to the lead 39, enabling the air conditioner blower to operate when the blower switch 11 is turned on. Turning blower switch 11 on energizes the second switch means SW2, allowing the relay K1 to be energized if signaled by the temperature regulating circuit A. Wiper 29 also closes the circuit for the temperature regulating circuit A by contacting resistance element 27. Depending upon the temperature of the thermistor TH, the regulating circuit A will cause relay K1 to provide voltage to the A/C clutch or to remove the supply. The resistance between the wiper 29 and resistance element 27 varies as wiper 29 is moved from junction 21 to the left. This resistance adds to the thermistor TH resistance and influences the temperature regulating circuit A. Positioning arm 15 at the extreme left activates the air conditioner clutch at lower thermistor temperatures than when positioned at the extreme right of the cool range 19. The mode switch 13 is preferably placed on A/C to block any ram air through the heater or vent.

Figure 3:
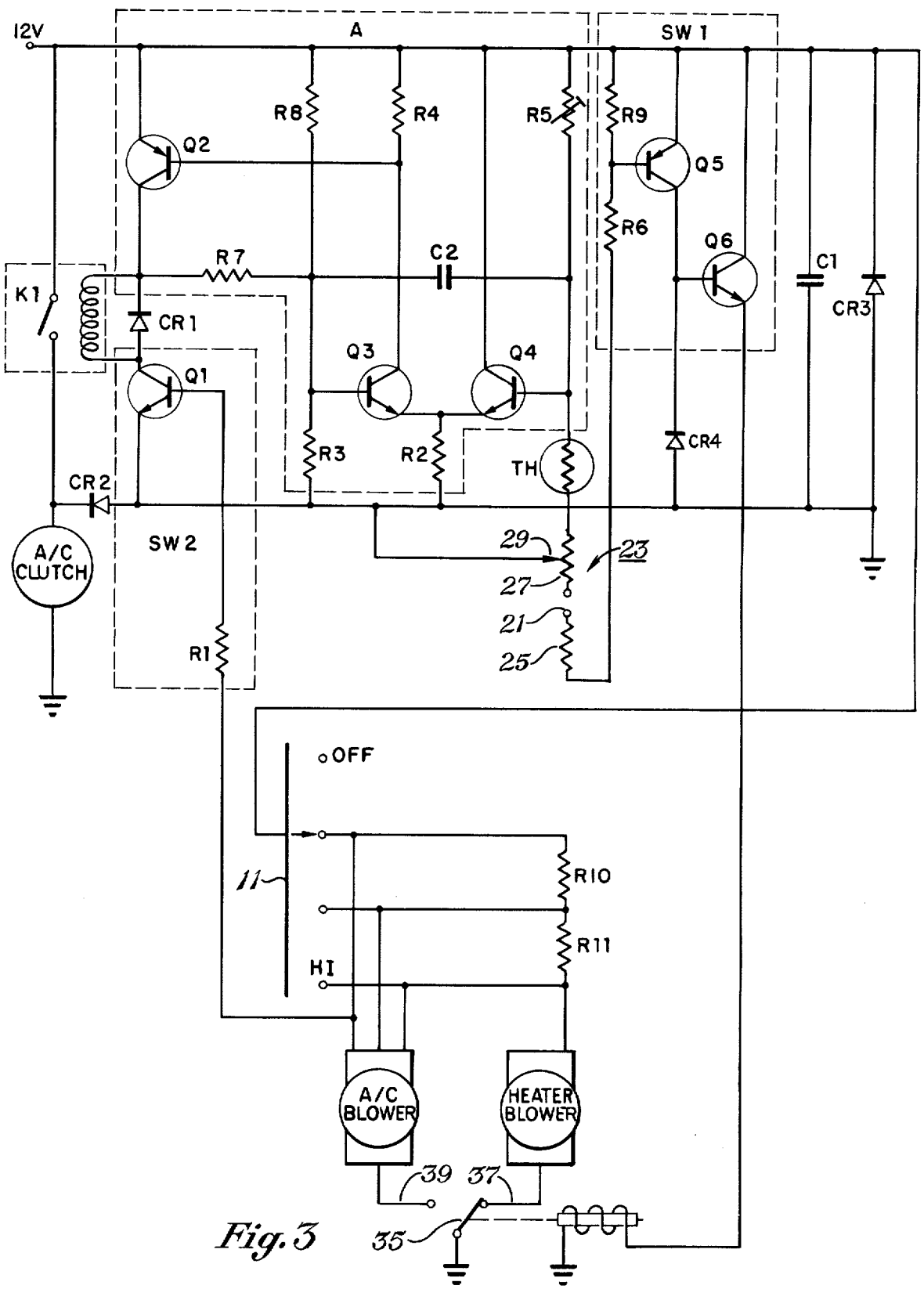
FIG. 3 is a diagram of the electrical circuitry of this invention.

The more detailed circuit diagram is shown in FIG. 3. Beginning on the right side of the diagram, a diode CR3 and capacitor C1 are placed in parallel and between the 12 V line and ground to protect the circuit from transient voltages in the vehicle circuit. Switch means SW1, as shown by the dotted lines, includes a 1 K Ohm resistor R9 connected to the 12 V line and to a 3.3 K Ohm resistor R6. Resistor R6 is connected to resistance element 25 of the slide potentiometer 23. The base of a transistor Q5 is connected between resistors R6 and R9. Its emitter is connected to the 12 V line and its collector to the base of Q6 and cathode of a diode CR4. Transistor Q6 has its base connected to the collector of transistor Q5. The collector of transistor Q6 is connected to the 12 V line and its emitter to relay 35. Diode CR4 has its anode connected to ground.

The temperature regulating circuit A, as shown by the dotted lines includes a bridge circuit in which a 20 K Ohm resistor R8 forms one leg. A 20 K Ohm resistor R3 forms another leg, and an adjustable 15 K Ohm resistor R5 forms another leg. The thermistor TH and resistance element 27 are is series and form the fourth leg. One side of resistor R8 is connected to the 12 V line. The other side of resistor R8 is connected to resistor R3, whose other side is connected to ground. One side of resistor R5 is connected to the 12 V line, and the other side to the thermistor. Ground for this side of the circuit is supplied by the wiper 29 when in contact with resistance element 27. The transistor Q3 has its base connected to the node formed by the junction of resistors R3 and R8, its collector to a 1 K Ohm resistor R4, which in turn is connected to the 12 V line. The emitter of transistor Q3 is connected to a 1 K Ohm resistor R2, whose other side is to ground. A transistor Q4 has its base connected to the other node of the bridge circuit between resistor R5 and thermistor TH. The collector of transistor Q4 is connected to the 12 V line, and its emitter leads to the same side of resistor R2 as transistor Q3.

The transistor Q2 has its base connected to the collector of transistor Q3, its emitter to the 12 V line, and its collector to relay K1. A 160 K Ohm resistor R7 is placed between the collector of transistor Q2 and the junction of resistors R3 and R8 for hysteresis. Relay K1 has its movable contact connected to the 12 V line and is adapted to contact the line to the air conditioner compressor clutch. A diode CR1 in parallel with relay K1 and a diode CR2 between ground and the air conditioner compressor clutch protect the circuit from inductive voltage transients.

Switch means SW2 comprises a transistor Q1 whose collector is connected to relay K1, its emitter to ground, and its base to 10 K Ohm resistor R1. Resistor R1 is connected to one of the air conditioner blower lines adapted to be contacted by blower switch 11. Two resitors R10 and R11 between blower switch 11 and the air conditioner and heater blower, provide a voltage divider circuit that yields three different speeds for the heater blower.

In operation, referring to FIG. 3, for the heater to operate, arm 15 will place wiper 29 in contact with resistance element 25. This allows current to flow from the 12 V line through resistors R9, R6 and resistance element 25 to ground, turning on transistor Q5. The conduction of transistor Q5 turns on transistor Q6 which provides voltage to relay 35 to contact the heater blower ground lead 37. Consequently, resistors R9, R6, potentiometer resistance element 25 and wiper 29, along with transistors Q5 and Q6 and relay 35 serve as means for selectively enabling the air conditioner blower and the heater blower to be energized when the heater blower switch 11 is turned on. These components also prevent the air conditioner and heater blowers from operating simultaneously. The slide potentiometer 23, resistors R6 and R9, and transistors Q5 and Q6, serve as switch means to energize the relay.

For the air conditioner to operate, arm 15 is moved to place wiper 29 in contact with resistance element 27. Removing wiper 29 from resistance element 25 turns off the transistors Q5 and Q6. The movable contact of relay 35 reverts to contact with the air conditioner blower ground lead 39, enabling the air conditioner blower to operate. The positioning of wiper arm 29 and resistance element 27 serves as enabling means for enabling the temperature regulating circuit A to function only when the wiper 29 is in contact with resistance element 27. Transistor Q1 and resistor R1 also form a part of the enabling means for permitting the temperature regulating circuit to function only when the blower switch 11 is turned on. The thermistor, which is located in the air conditioner evaporator air stream, provides an increase in resistance as the temperature decreases. If the resistance, as trimmed by resistor R5, is such that the voltage at the base of transistor Q4 is less than the voltage at the base of transistor Q3, then transistor Q3 begins to conduct. This turns on transistor Q2, which conducts since transistor Q1 has been turned on by the blower switch 11. Relay K1 is energized to actuate the air conditioner clutch. Resistor R7 then in effect goes in parallel with resistor R8 due to the conduction through transistor Q1. Once the temperature cools the thermistor TH to a selected minimum temperature, the increase in its resistance causes the voltage at the base of transistor Q4 to increase over the voltage at the base of transistor Q3. Transistor Q3 ceases conduction, turning off transistor Q1 and relay K1. The relaive position of wiper 29 varies the effective resistance of resistance element 27, adding a variable resistance in series with thermistor TH to allow the operator to control the temperature at which the air conditioner compressor clutch will be energized.

It should be apparent that an invention having significant improvements has been provided. The circuitry allows the existing vehicle heater and vent controls to be used with an after market air conditioner installation, giving it the appearance of a factory installation. The circuit is simple and inexpensive.

While the inventon has been shown in only one of its forms, it should be apparent to those skilled in the art that it is not so limited but is susceptible to various changes and modifications without departing from the spirit thereof.

For example, rather than using a split potentiometer with two resistance elements, the heater side could be simply a contact or conductor since the resistance of resistance element 25 has no effect on the heater blower. Also the temperature regulating circuit can vary to a large extent, and relay K1 could be replaced with solid state circuitry.

I claim:

1. A circuit means for enabling one to install an air conditioner in a motor vehicle having a heater blower using the vehicle's existing heater and vent controls, the heater and vent controls including an electrical heater blower switch and a member that is movable from a coolest position to a warmest position for mechanically controlling the temperature of the air being discharged into the vehicle, the air conditioner having a separate blower and a compressor clutch that is electrically controlled by a temperature sensing device and a temperature regulating circuit, the circuit means comprising:

a potentiometer having a resistance element and a wiper, the wiper being mounted in engagement with the member for movement therewith;

a conductor mounted adjacent the resistance element and electrically insulated from the resistance element, the wiper being positioned to disengage from the resistance element and engage the conductor as the member is moved from the coolest position towards the warmest position;

first enabling means for selectively enabling the air conditioner blower and the heater blower to be energized when the heater blower switch is turned on, and for preventing the air conditioner and heater blowers from operating simultaneously, the air conditioner blower being connected to the heater blower switch in parallel with the heater blower;

the first enabling means being operably connected to the potentiometer for enabling the heater blower by placing the wiper in contact with the conductor and enabling the air conditioner blower by disengaging the wiper from the conductor; and second enabling means operably connected to the potentiometer for enabling the temperature regulating circuit to function only when the wiper is in contact with the resistance element, the variable positions of the wiper contacting the resistance element affecting the temperature regulating circuit to allow the operator to control the air conditioner temperature.

2. A circuit means for enabling one to install an air conditioner in a motor vehicle having a heater blower using the vehicle's existing heater and vent controls, the heater and vent controls including an electrical heater blower switch and an arm that is slidable from a coolest position to a warmest position for mechanically controlling the temperature of the air being discharged into the vehicle, the air conditioner having a separate blower and a compressor clutch that is electrically controlled by a temperature sensing device and a temperature regulating circuit, the circuit means comprising:

a slide potentiometer having a resistance element and a wiper, the wiper being mounted in engagement with the arm for movement therewith;

a conductor mounted at one end of and electrically insulated from the resistance element, the wiper being positioned to disengage itself from the resistance element and engage the conductor as the arm is moved from the coolest position towards the warmest position;

first enabling means for selectively enabling the air conditioner blower and the heater blower to be energized when the heater blower switch is turned on and for preventing the air conditioner and heater blowers from operating simultaneously, the air conditioner blower being connected to the heater blower switch in parallel with the heater blower; the first enabling means enabling the heater blower only when the wiper is in contact with the conductor and enabling the air conditioner blower only when the wiper is removed from contact with the conductor; and second enabling means connected to the resistance element for enabling the temperature regulating circuit to function only when the wiper is in contact with the resistance element, the variable positions of the wiper contacting the resistance element affecting the temperature regulating circuit to allow the operator to control the air conditioning temperature.

3. The circuit according to claim 2 wherein the conductor is also a resistance element.

4. The circuit according to claim 2 wherein the second enabling means also permits the temperature regulating circuit to function only when the heater blower switch is turned on.

5. The circuit according to claim 2 wherein the first enabling means comprises:

a relay having a movable contact with a first position in electrical contact with one lead of the heater blower and a second position in electrical contact with one lead of the air conditioner blower, the movable contact providing grounding in the first and second positions to complete the circuits to energize one of the blowers, the movable contact returning to the second position when the relay is de-energized; and switch means for energizing the relay to switch the movable contact to the first position, the switch means being connected to the conductor so that the circuit through the switch means is completed by the contact of the wiper with the conductor.

6. A circuit means for enabling one to install an air conditioner in a motor vehicle having a heater blower using the vehicle's existing heater and vent controls, the heater and vent controls including an electrical heater blower switch and an arm that is slidable from a coolest position to a warmest position for mechanically controlling the temperature of the air being discharged into the vehicle, the air conditioner having a separate blower and a compressor clutch that is electrically controlled by a temperature sensing device and a temperature regulating circuit, the circuit means comprising:

a slide potentiometer having first and second coplanar resistance elements that are electrically insulated from each other, the potentiometer having a single siper that is in engagement with the arm and movable from the first resistance element to the second resistance element as the arm is moved from the coolest position to the warmest position;

the air conditioner blower being connected to the heater blower switch in parallel with the heater blower, both the air conditioner blower and the heater blower having electrical circuits extending from the heater blower switch to ground;

a relay connected in the heater blower and air conditioner blower electrical circuits, the relay having a movable contact that is actuable to selectively complete one of the blower electrical circuits while opening the other;

switch means connected to the first resistance element for causing the relay to complete the heater blower electrical circuit when the wiper is in contact with the first resistance element and for causing the relay to complete the air conditioner blower electrical circuit when the wiper is in contact with the second resistance element; and enabling means connected to the second resistance element for enabling the temperature regulating circuit to function only when the wiper is in contact with the second resistance element and only when the heater blower switch is turned on, the variable positions of the wiper contacting the second resistance element affecting the temperature regulating circuit to allow the operator to control the air conditioning temperature.

7. The circuit according to claim 6 wherein the movable contact of the relay, when de-energized by the switch means, reverts to the position completing the air conditioner blower circuit, wherein the wiper is connected to ground, and wherein the placing of the wiper in contact with the first resistance element completes a circuit to energize the switch means for powering the relay.

8. The circuit according to claim 6 wherein the wiper is connected to ground, wherein the enabling means is connected to the air conditioning blower circuit, and wherein placing the wiper in contact with the second resistance element completes the air conditioning blower circuit and also powers the enabling means.

9. The circuit according to claim 8 wherein the temperature sensing device comprises a thermistor and wherein the temperature regulating circuit comprises a bridge circuit with one leg of the bridge being the thermistor in series with the second resistance element, the potential difference in the bridge due to temperature changes in the thermistor driving an amplifier, which closes a circuit to the air conditioner compressor clutch when the potential difference reaches a selected minimum.

10. The circuit according to claim 6 wherein the movable contact of the relay is connected directly to ground.

* * * * *